(12) United States Patent
Schmidt

(10) Patent No.: US 7,344,206 B2
(45) Date of Patent: Mar. 18, 2008

(54) METHOD USED FOR BLEEDING A HYDRAULIC VEHICLE BRAKE SYSTEM

(75) Inventor: Guenther Schmidt, Kirchheim A.N. (DE); by Gerda Schmidt, legal representative, Kirchheim A.N. (DE)

(73) Assignee: Robert Bosch GmbH, Stuttgart (DE)

( * ) Notice: Subject to any disclaimer, the term of this patent is extended or adjusted under 35 U.S.C. 154(b) by 491 days.

(21) Appl. No.: 10/485,356

(22) PCT Filed: Jul. 9, 2002

(86) PCT No.: PCT/DE02/02502

§ 371 (c)(1),
(2), (4) Date: Jan. 30, 2004

(87) PCT Pub. No.: WO03/016114

PCT Pub. Date: Feb. 27, 2003

(65) Prior Publication Data

US 2004/0251740 A1 Dec. 16, 2004

(30) Foreign Application Priority Data

Aug. 3, 2001 (DE) .............................. 101 38 125

(51) Int. Cl.
*B60T 8/32* (2006.01)
(52) U.S. Cl. ..................... 303/191; 188/352
(58) Field of Classification Search ................ 303/191, 303/116.1; 188/352
See application file for complete search history.

(56) References Cited

U.S. PATENT DOCUMENTS

| 5,788,344 | A  | * | 8/1998 | Friedow et al. .......... 303/119.2 |
| 6,193,031 | B1 | * | 2/2001 | Baechle et al. ............. 188/352 |
| 6,196,365 | B1 | * | 3/2001 | Gomi ........................ 188/352 |
| 6,199,958 | B1 | * | 3/2001 | Baechle ...................... 303/10 |
| 6,209,969 | B1 | * | 4/2001 | Aumuller et al. ........ 303/116.1 |
| 6,729,698 | B2 | * | 5/2004 | Kusano et al. .............. 303/191 |
| 2003/0150680 | A1 | * | 8/2003 | Bass ........................ 188/352 |
| 2004/0040807 | A1 | * | 3/2004 | Burgdorf et al. ............ 188/352 |

FOREIGN PATENT DOCUMENTS

| DE | 39 35 353 A1 | 4/1991 |
| EP | 0 159 127 A1 | 10/1985 |
| WO | WO 98/28174 | 7/1998 |
| WO | WO 99/52756 | 10/1999 |
| WO | WO02/42135 A1 | 5/2002 |

* cited by examiner

*Primary Examiner*—Robert A. Siconolfi
(74) *Attorney, Agent, or Firm*—Ronald E. Greigg

(57) ABSTRACT

The invention relates to a method for degassing a hydraulic vehicle brake system that has an external-force service brake system and a muscle-powered auxiliary brake system. For the degassing, brake pressure buildup valves are opened, preferably successively, so that brake fluid flows through the brake pressure buildup valves, disconnection valves and a master cylinder and reaches a brake fluid reservoir. The brake fluid positively displaces any brake fluid containing gas from the vehicle brake system into the brake fluid reservoir, where gas bubbles can escape from the brake fluid. Compressibility of the brake fluid from gas bubbles is avoided.

6 Claims, 2 Drawing Sheets

METHOD USED FOR BLEEDING A HYDRAULIC VEHICLE BRAKE SYSTEM

CROSS-REFERENCE TO RELATED APPLICATIONS

This application is a 35 USC 371 application of PCT/DE 02/02502 filed on Jul. 9, 2002.

BACKGROUND OF THE INVENTION

1. Field of the Invention

The invention relates to an improved method for degassing a hydraulic vehicle brake system of the type an external-force service brake system and a muscle-powered auxiliary brake system.

2. Description of the Prior Art

One vehicle brake system of the type with which this invention is concerned is known from International Patent Disclosure WO 98/28174. The external-force service brake system of the known vehicle brake system has a hydraulic pump, which can be driven by an electric motor and whose intake side is connected to a brake fluid reservoir. A hydraulic reservoir is connected to a pressure side of the hydraulic pump. The electric motor, hydraulic pump and hydraulic reservoir form an external energy source for actuating the external-force service brake system. Wheel brake cylinders are connected to the pressure side of the hydraulic pump and the hydraulic reservoir, that is, to the external energy source, and each wheel brake cylinder has a brake pressure buildup valve, which is connected between the external energy source and the wheel brake cylinder. Via a respective brake pressure reduction valve, the wheel brake cylinders are connected to the brake fluid reservoir. The brake pressure buildup valves and the brake pressure reduction valves form brake pressure control valve assemblies, with which a wheel brake pressure in the wheel brake cylinders can be set individually for each wheel. Anti-lock braking, traction control and/or vehicle dynamics control can also be performed with the brake pressure control valve assemblies. This is known per se and will not be described in further detail here.

In the event of failure of the service brake system, the known vehicle brake system has a muscle-powered auxiliary brake system. It includes a master cylinder that can be actuated by muscle power. At least one of the wheel brake cylinders of the vehicle brake system is connected to the master cylinder, with the interposition of a disconnection valve. If the service brake system fails, the disconnection valves are open or opened and the brake pressure buildup valves and brake pressure reduction valves are closed. As a result, the external energy source is disconnected hydraulically from the muscle-powered auxiliary brake system, and the wheel brake cylinders connected to the master cylinder are made to communicate hydraulically with the master cylinder, so that by actuation of the master cylinder, braking can be done with the wheel brake cylinders connected to it. During a service braking operation, the disconnection valves are closed, so that the master cylinder is disconnected hydraulically from the external-force service brake system and is not subjected to pressure by it. The service braking operation has been described above.

In external-force service brake systems that have a hydraulic pump and a hydraulic reservoir as their external energy source, the possibility exists that gas bubbles will occur in the brake fluid, causing an unwanted compressibility of the brake fluid. For instance, if the hydraulic reservoir is embodied as a gas pressure reservoir with a diaphragm that divides a reservoir gas from the brake fluid, then diffusion of reservoir gas through the diaphragm into the brake fluid is unavoidable. It is true that the gas is initially dissolved in the brake fluid, but if the quantity of gas that has diffused into the brake fluid increases and can no longer be dissolved completely, it will go out of solution and bubble out or in other words form gas bubbles. In the event of a drop in pressure of the brake fluid as well, dissolved gas can come out of solution and bubble out or form gas bubbles. The pressure drop need not at all be caused by a defect of the vehicle brake system; even typical pressure fluctuations in the hydraulic fluid of the vehicle brake system during operation can cause gas dissolved in the brake fluid to bubble out. In the case of a hydraulic reservoir that has a piston as well, it must be expected that gas will get past the piston and into the brake fluid. The hydraulic pump can also aspirate air and incorporate it into the brake fluid.

To avoid gas bubbles in the muscle-powered auxiliary brake system and in the wheel brake cylinders, cylinder and piston assemblies are provided, in the vehicle brake system of the aforementioned WO 98/28174, for those wheel brake cylinders that are connected to the master cylinder. The cylinder-piston assemblies form media separators, which separate the brake fluid of the external-force service brake system from the brake fluid of the muscle-powered auxiliary brake system and of the wheel brake cylinders. This prevents gas from the brake fluid in the external-force service brake system from getting into the brake fluid of the muscle-powered auxiliary brake system and into the wheel brake cylinders. Compressibility of the brake fluid from gas bubbles in the muscle-powered auxiliary brake system is avoided. Compressibility of the brake fluid of the muscle-powered auxiliary brake system would lessen its braking action or put the auxiliary brake system out of operation. Gas bubbles in the brake fluid in the external-force service brake system and an attendant compressibility of the brake fluid are tolerated as a compromise in the known vehicle brake system, since the hydraulic pump and the hydraulic reservoir make an adequate quantity of brake fluid available so that despite brake fluid compressibility, an adequate brake fluid pressure can be built up in the wheel brake cylinders.

SUMMARY AND ADVANTAGES OF THE INVENTION

For degassing a hydraulic vehicle brake system that has an external-force service brake system and a muscle-powered auxiliary brake system, the invention proposes that the brake pressure buildup valve or valves of one or more wheel brake cylinders and the disconnection valve disposed between the master cylinder and the wheel brake cylinders be opened, and the brake pressure reduction valves be closed or kept closed. Degassing is understood to mean the removal of brake fluid that can have gas bubbles from the vehicle brake system and its replacement with brake fluid that is free of gas bubbles. From the hydraulic reservoir that is under pressure, brake fluid flows through the open brake pressure buildup valves, through the open disconnection valve, and through the master cylinder into the brake fluid reservoir, in which gas bubbles can escape from the brake fluid. In this way, brake fluid that might have gas bubbles is positively displaced out of the vehicle brake system into the brake fluid reservoir and replaced with brake fluid from the hydraulic reservoir. Gas bubbles, and in particular an accumulation of gas bubbles in the vehicle brake system, are avoided as a result. Aside from the advantage of degassing the brake fluid in the vehicle brake system, the method of the invention has the further advantage that media separators can be dispensed with.

In one embodiment the hydraulic pump is turned on for the degassing. It pumps brake fluid out of the brake fluid reservoir through the open brake pressure buildup valves, the open disconnection valves, and the master cylinder back into the brake fluid reservoir. The vehicle brake system, including its brake pressure buildup valves, disconnection valves, and master cylinder, is thereby "thoroughly flushed" with brake fluid, and gas bubbles contained in the brake fluid in the brake fluid reservoir escape. It is also possible to evacuate the hydraulic reservoir, by opening the brake pressure buildup valves and the disconnection valves, before the hydraulic pump is switched on so that the brake fluid from the hydraulic reservoir that can contain gas bubbles will reach the brake fluid reservoir, where the gas bubbles can escape. The degassing operation can be repeated multiple times.

The invention also contemplates a wheel by wheel degassing of the vehicle brake system, in which only one brake pressure buildup valve and either the associated brake pressure reduction valve or the disconnection valve is opened at a time. That is, those parts of the vehicle brake system associated with one vehicle wheel are degassed individually. This assures reliable degassing of each part of the vehicle brake system associated with one wheel brake cylinder; if a plurality of brake pressure buildup valves are instead opened simultaneously, then those parts of the vehicle brake system associated with the wheel brake cylinders might not all be flushed equally well.

It is also contemplated that for the degassing, the brake pressure buildup valves and, instead of the disconnection valves, the brake pressure reduction valves be opened; the disconnection valves are closed. In that case, brake fluid from the hydraulic reservoir and/or the hydraulic pump flows through the brake pressure buildup valves and the brake pressure reduction valves into the brake fluid reservoir, where gas bubbles can escape. In this feature of the invention, the master cylinder is not flushed in the degassing, but brake fluid from the vehicle brake system that can contain gas bubbles is still prevented from reaching the master cylinder.

In order not to intervene in braking operation, the degassing may be done only when the vehicle is at a stop, which can easily be detected using wheel rotation sensors, which are already present in modern vehicle brake systems that have traction control.

The invention may employ a special master cylinder particularly suitable for performing the improved degassing method. A connection, associated with the wheel brake cylinder, of the master cylinder discharges approximately at a tangent into a cylinder bore of the master cylinder. The purpose of this is as follows: Upon flushing of the vehicle brake system for the degassing, brake fluid, with the disconnection valve open, flows through the connection associated with the wheel brake cylinder into the master cylinder and flows out again at a different point, where the master cylinder is connected to the brake fluid reservoir. Because of the approximately tangential orientation of the connection associated with the wheel brake cylinder, the brake fluid flows approximately at a tangent into the master cylinder; a helical flow is established along a wall of the cylinder bore, in the direction of the connection associated with the brake fluid reservoir of the master cylinder, where the brake fluid reservoir is connected. Because of the flow along the cylinder wall, gas bubbles adhering to the wall are detached and carried out of the master cylinder along with the flow. An otherwise increasing accumulation of gas bubbles in the master cylinder over the course of time is thereby avoided.

BRIEF DESCRIPTION OF THE DRAWINGS

The invention is described in further detail below in conjunction with the drawings, in which.

DESCRIPTION OF THE PREFERRED EMBODIMENT

Figure 1:
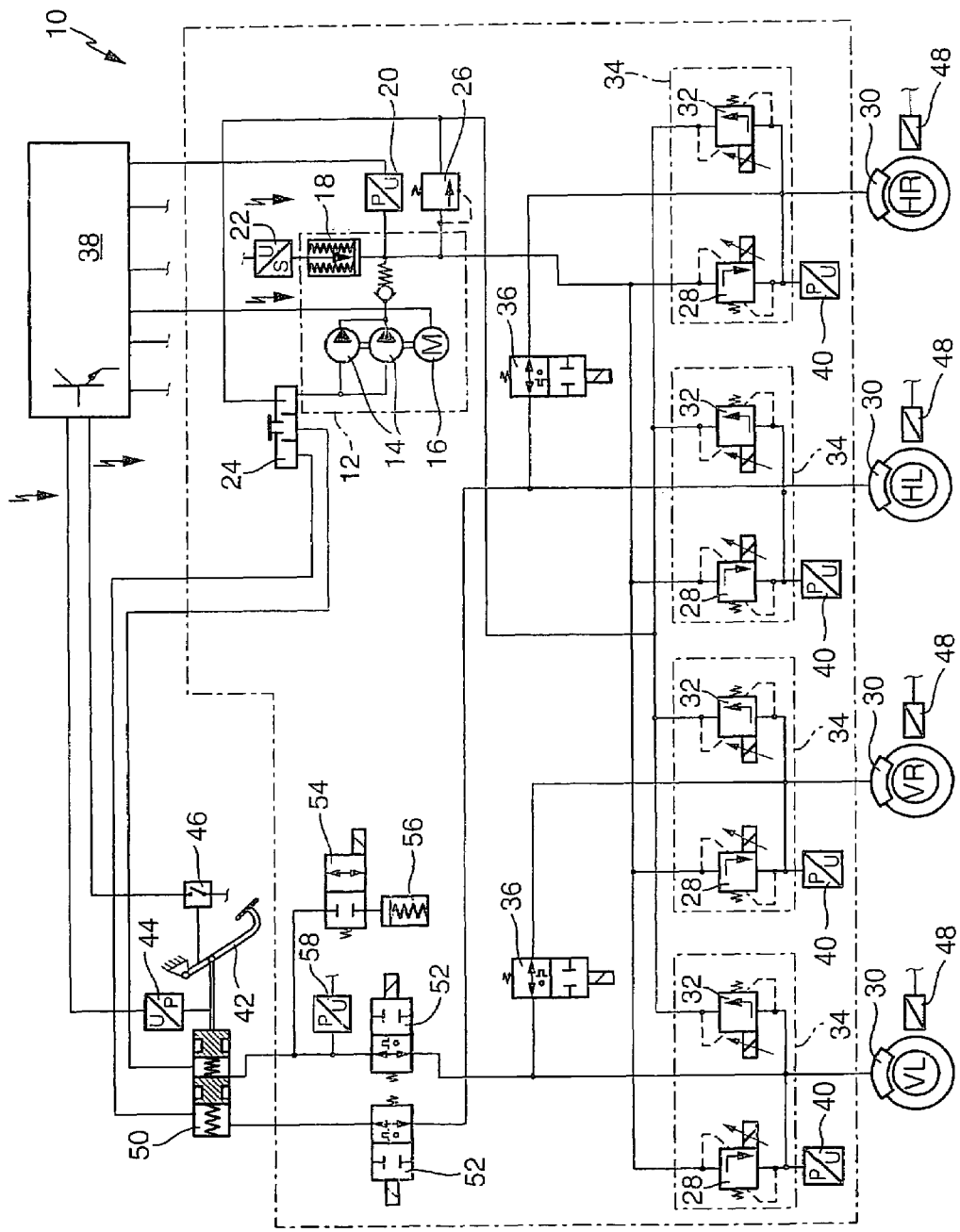
FIG. 1 is a hydraulic circuit diagram of a hydraulic vehicle brake system for performing the method of the invention.

The hydraulic vehicle brake system 10 according to the invention, shown in FIG. 1, has an external-force service brake system and a muscle-powered auxiliary brake system; it is accordingly a so-called electrohydraulic vehicle brake system with a muscle-powered auxiliary brake system.

As its external energy source 12, the vehicle brake system 10 has two hydraulic pumps 14, connected hydraulically parallel, which can be driven by a common electric motor 16. A high-pressure hydraulic reservoir 18, which is a component of the external energy source 12, is connected to a pressure side of the hydraulic pumps 14. By way of example, the hydraulic reservoir 18 can be embodied as a gas pressure reservoir that has a diaphragm, as a metal bellows reservoir acted upon by gas pressure or by spring force, or as a piston reservoir acted upon by spring force. A pressure sensor 20 and a travel sensor 22 are connected to the hydraulic reservoir 18. An intake side of the hydraulic pumps 14 is connected to a brake fluid reservoir 24. A pressure limiting valve 26 connects the pressure side with the intake side of the hydraulic pumps 14.

With the interposition of brake pressure buildup valves 28, wheel brake cylinders 30 are connected to the external energy source 12. The wheel brake cylinders 30 are connected hydraulically parallel to one another; each wheel brake cylinder 30 is assigned its own pressure buildup valve 28. Each wheel brake cylinder 30 is also assigned a brake pressure reduction valve 32, by way of which the wheel brake cylinders 30 are connected to the brake fluid reservoir 24. The brake pressure buildup valve 28 assigned to a wheel brake cylinder 30 and the brake pressure reduction valve 32 assigned to the same wheel brake cylinder 30 form a brake pressure control valve assembly 34. In the exemplary embodiment of the vehicle brake system 10 shown and described, the brake pressure buildup valves 28 and brake pressure reduction valves 32 are embodied as proportional pressure limiting valves, which are actuatable by a proportional electromagnet. It is known and possible for the two pressure limiting valves 28, 32 assigned to one wheel brake cylinder 30 to be replaced with two 2/2-way magnet valves, or by one 3/3-way magnet valve.

Wheel brake cylinders 30 associated with one vehicle axle are connected to a brake pressure equalization valve 36, which can be closed for individual-wheel brake pressure regulation, particularly for anti-lock braking or traction control purposes. The brake pressure equalization valves 36 are embodied as 2/2-way magnet valves and are open in their currentless basic position.

For open- or closed-loop control, the vehicle brake system 10 has an electronic control unit 38, which receives signals, among other sources, from the pressure sensor 20 and the travel sensor 22 of the hydraulic reservoir 18 and from pressure sensors 40 connected to the wheel brake cylinders 30, and which controls, among other components, the electric motor 16 of the hydraulic pumps 14 and all the magnet valves 28, 32, 36 of the vehicle brake system 10. As its braking force or brake pressure set-point-value transducer, the vehicle brake system 10 has a brake pedal 42, to which a pedal travel sensor 44 is connected. A brake light switch 46 is also connected to the brake pedal 42, and with which it can be ascertained whether the brake pedal 42 is actuated. With the two hydraulic pumps 14, a minimum pressure sufficient for braking is maintained at all times in the hydraulic reservoir 18, regardless of any actuation of the brake pedal 42. If the brake pedal 42 is actuated, then as a function of a position of the brake pedal 42, a wheel brake pressure is set in the wheel brake cylinders 30 by the brake pressure control valve assemblies 34, which include the brake pressure buildup valves 28 and the brake pressure reduction valves 32. This is known per se and will not be addressed in further detail here. As long as the equalization valves 36 are open, the wheel brake pressure in the wheel brake cylinders 30 of one vehicle axle will be the same; brake pressure regulation for an individual axle is possible and provided for. For individual-wheel brake pressure regulation, the equalization valves 36 are closed. This is necessary particularly for anti-lock braking, traction control, and/or vehicle dynamics control. These controls as well, by means of the brake pressure control valve assemblies 34, are known per se and will therefore not be addressed further here. For anti-lock braking, traction control and/or vehicle dynamics control, each vehicle wheel is assigned one wheel rotation sensor 48, whose signals are carried to the electronic control unit 38 and are processed as control input variables by it.

The external energy source 12, the brake pressure buildup valves 28, the brake pressure reduction valves 32, and the wheel brake cylinders 30 form the external-force service brake system of the hydraulic vehicle brake system 10.

For emergency or auxiliary braking by muscle power in the event of failure of the service brake system, the vehicle brake system 10 has a master cylinder 50, which is actuated by the brake pedal 42. The master cylinder 50 is embodied as a dual-circuit master cylinder 50, to which the wheel brake cylinders 30 are connected, hydraulically disconnected from one another and with the interposition of one disconnection valve 52 each. In the exemplary embodiment shown, the wheel brake cylinders 30 assigned to the front axle form one brake circuit, while the wheel brake cylinders 30 assigned to the rear axle form a different brake circuit. A different brake circuit configuration of the wheel brake cylinders 30 is also possible. The disconnection valves 52 are embodied as 2/2-way magnet valves that are open in their basic position. For external-force braking, the disconnection valves 52 are closed, and as a result the master cylinder 50 is disconnected hydraulically from the wheel brake cylinders 30.

A so-called pedal travel simulator 56 is connected to one brake circuit of the master cylinder 50, with the interposition of a simulator valve 54. The simulator valve 54 is a 2/2-way magnet valve that is closed in its currentless basic position. For the external-force braking, the simulator valve 54 is opened while the disconnection valves 52 are closed, and as a result the pedal travel simulator 56 is made to communicate hydraulically with the master cylinder 50. The pedal travel simulator 56 is a hydraulic reservoir, acted upon for instance by spring force or gas pressure, into which brake fluid from the master cylinder 50 can be positively displaced. With the disconnection valves 52 closed, the pedal travel simulator 56 makes a travel of the brake pedal 42 possible, with an increase in pedal force that is at least similar to a pedal force increase of the kind that is usual in vehicle brake systems actuated by muscle power. For the sake of redundancy, a pressure sensor 58 is connected to one brake circuit of the master cylinder 50, and its signal can be used as a set-point value, instead of the pedal travel, for the wheel brake pressures to be built up in the wheel brake cylinders 30.

The master cylinder 50 and the wheel brake cylinders 30 connected to it form the muscle-powered auxiliary brake system of the vehicle brake system 10.

By means of the hydraulic pumps 14 and/or the hydraulic reservoir 18 of the external energy source 12, air and/or compressed gas from the hydraulic reservoir 18 can get into the brake fluid. The air or the compressed gas, hereafter simply called gas, may either be dissolved in the brake fluid or contained in it in the form of gas bubbles. Gas dissolved in the brake fluid can also form gas bubbles as a result of a pressure change or enrichment. This makes the brake fluid compressible. Although this compressibility can be compensated for by means of the external energy source 12, the function of the muscle-powered auxiliary brake system is at least diminished by compressibility of the brake fluid. To avoid gas bubbles in the brake fluid or to remove them from the brake fluid or in other words to degas the brake fluid, the method of the invention described below is provided:

For the degassing, the brake pressure buildup valves 28 are opened. Brake fluid that is under pressure flows out of the hydraulic reservoir 18 of the external energy source 12 through the brake pressure buildup valves 28, the open disconnection valves 52, and the master cylinder 50, into the brake fluid reservoir 24, where gas bubbles can escape from the brake fluid. The method is preferably performed one wheel brake at a time. That is, each wheel brake cylinder 30 is bled individually; that is, only one brake pressure buildup valve 28 at a time is ever opened. The degassing is preferably performed only when the vehicle is at a stop, which can be ascertained by means of the wheel brake sensors 48, and when the brake pedal 42 is not actuated, which can be ascertained by means of the brake light switch 46. This is very important, because during the degassing the vehicle brake system 10 is not in readiness for braking. If it were possible to initiate virtually delay-free braking during the degassing, then degassing even while the vehicle is in motion would be conceivable.

For the degassing, the hydraulic pumps 14 can be on or can be turned on. It is also possible first to wait for the hydraulic reservoir 18 to be evacuated, so that any brake fluid that contains gas will escape as completely as possible from the hydraulic reservoir 18. By turning on the hydraulic pumps 14, the hydraulic reservoir 18 is then again acted upon by pressure and filled with brake fluid. This can be repeated multiple times, to achieve the most complete possible removal of brake fluid that can contain gas from the hydraulic reservoir 18. A concluding imposition of pressure on and filling of the hydraulic reservoir 18 with brake fluid takes place immediately after a final evacuation of the hydraulic reservoir 18, so that the vehicle brake system 10 is ready for braking or becomes so as fast as possible.

The evacuation of the hydraulic reservoir 18, which may be repeated, can also be effected by opening at least one of the brake pressure buildup valves 28 and the associated brake pressure reduction valve 32, with the disconnection valves 52 closed, directly into the brake fluid reservoir 24.

This prevents brake fluid that contains gas from flowing out of the hydraulic reservoir 18 in the direction of the master cylinder 50.

To remove brake fluid that might contain gas from the brake pressure reduction valves 32, these valves, during the degassing, can be opened jointly with the respective associated brake pressure buildup valve 28, so that brake fluid from the external energy source 12 also flows through the brake pressure reduction valves 32. The degassing of the brake pressure reduction valves 32 can also be done wheel by wheel. The disconnection valves 52 are preferably closed for degassing the brake pressure reduction valves 32, and the equalization valves 36 may be closed. If for the degassing the brake pressure buildup valves 28 and brake pressure reduction valves 32 are opened and the disconnection valves 52 are closed, then the brake fluid does not flow through the master cylinder 50 but instead passes from the brake pressure reduction valves 32 directly into the brake fluid reservoir 24. This has the advantage of preventing gas bubbles from entering the master cylinder 50.

For degassing the equalization valves 36, these valves are opened, along with a respective brake pressure buildup valve 28, communicating with the equalization valve 36, and a brake pressure reduction valve 32, also communicating with the equalization valve 36, which is assigned to a different wheel brake cylinder 30 from the brake pressure buildup valve 28. The disconnection valves 52 are preferably closed. From the external energy source 12, brake fluid flows through the opened brake pressure buildup valve 28, the open equalization valve 36, and the opened brake pressure reduction valve 32 into the brake fluid reservoir 24.

Figure 2:
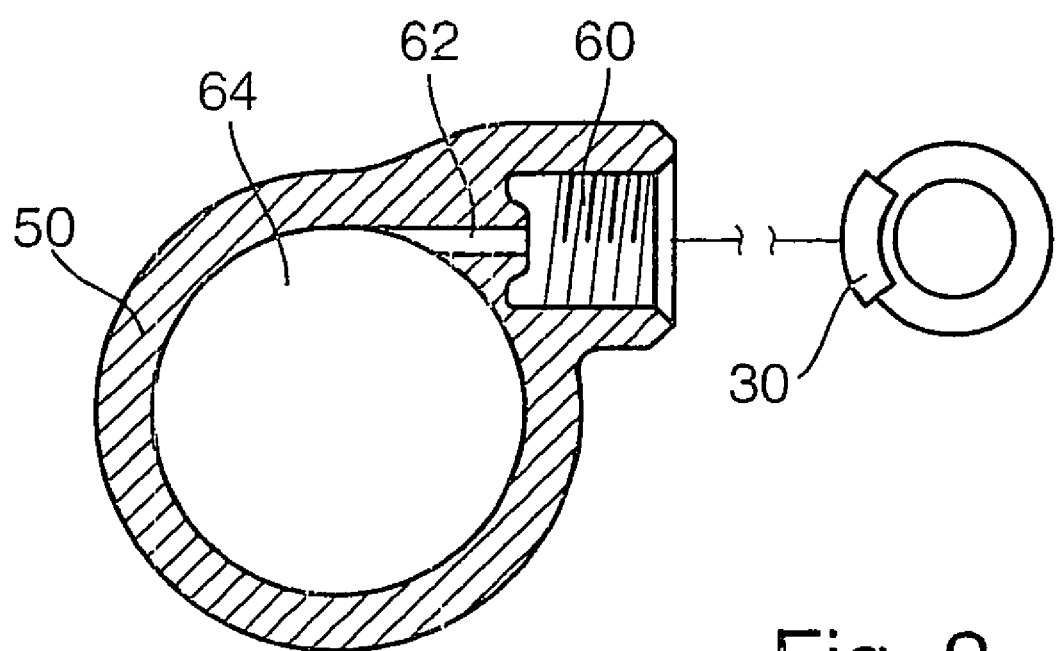
FIG. 2 is a cross section through a master cylinder of the vehicle brake system of FIG. 1.

FIG. 2 shows a cross section of the master cylinder 50 in the region of the connection 60 associated with the wheel brake cylinder. For the sake of clarity, one of the wheel brake cylinders 30 is represented symbolically, but without the interposed disconnection valve 52. As can be seen in the drawing, a bore 62 of the connection 60 discharges at a tangent into a cylinder bore 64 of the master cylinder 50. The purpose of disposing the bore 62 of the connection 60, associated with the wheel brake cylinder, tangentially with respect to the cylinder bore 64 of the master cylinder 50 is as follows: In the degassing according to the invention, which has been explained above, brake fluid flows from the direction of the wheel brake cylinders 30 through the connection 60 into the cylinder bore 64 of the master cylinder 50. The brake fluid leaves at a different point, not visible in FIG. 2, for instance through a central valve in a piston of the master cylinder 50 or through a snifting bore, which is mounted, with axial spacing from the bore 62 of the connection 60 associated with the wheel brake cylinder, in a cylinder wall of the master cylinder 50. Because of the tangential disposition of the bore 62 of the connection 60 associated with the wheel brake cylinder, the brake fluid upon the degassing flows circumferentially along the inside of the cylinder wall of the master cylinder 50; a helical flow develops in the cylinder bore 64, along the cylinder wall. The flow along the cylinder wall detaches gas bubbles that might have been deposited on the inside of the cylinder wall of the master cylinder 50 from the cylinder wall. The brake fluid flowing helically through the cylinder bore 64 entrains the gas bubbles and thereby carries them out of the master cylinder 50 in the direction of the brake fluid reservoir 24 (FIG. 1), where the gas bubbles can escape from the brake fluid. Degassing of the master cylinder 50, that is, a removal from the master cylinder 50 of any gas bubbles that may be present in the master cylinder 50, is thereby achieved. The master cylinder 50 is especially well suited for the method described for degassing a hydraulic vehicle brake system 10.

The foregoing relates to preferred exemplary embodiments of the invention, it being understood that other variants and embodiments thereof are possible within the spirit and scope of the invention, the latter being defined by the appended claims.

The invention claimed is:

1. A method for degassing at least a portion of a hydraulic vehicle brake system of the type having an external-force service brake system and a muscle-powered auxiliary brake system, in which the external-force service brake system has a hydraulic pump (14) whose intake side is connected to a brake fluid reservoir (24) and to whose pressure side is connected to a hydraulic reservoir (18) and also to at least one wheel brake cylinder (30) with a brake pressure buildup valve (28) interposed, and the wheel brake cylinder is connected to the brake fluid reservoir (24) via a brake pressure reduction valve (32), and the muscle-powered auxiliary brake system has a master cylinder which is actuatable by muscle power, which master cylinder is connected to the brake fluid reservoir (24) and also to the wheel brake cylinder with a disconnection valve (52) interposed, the method for degassing at least a portion of the vehicle brake system (10), comprising, opening the brake pressure buildup valve (28) and the disconnection valve (52), and closing the brake pressure reduction valve (32), wherein the hydraulic reservoir (18) is evacuated for the degassing.

2. The method for degassing at least a portion of a hydraulic vehicle brake system of claim 1, further comprising the step of turning on the hydraulic pump (14) for the degassing.

3. The method for degassing at least a portion of a hydraulic vehicle brake system of claim 1, wherein the vehicle brake system (10) has a plurality of wheel brake cylinders (30), each having an associated brake pressure buildup valve (28) and brake pressure reduction valve (32), each of the brake pressure buildup valves (28) being connected to the pressure side of the hydraulic pump (14) and to the hydraulic reservoir (18) and each of the brake pressure reduction valves (32) being connected to the brake fluid reservoir (24), and at least one wheel brake cylinder (30) connected to the master cylinder (50) with the interposition of a disconnection valve (52); and wherein degassing is performed for at least a portion of the brake system one wheel at a time by opening the brake pressure buildup valve (28) of the one wheel brake cylinder (30), while the brake pressure buildup valve (28) and/or the brake pressure reduction valve (32) of the other wheel brake cylinders (30) are closed.

4. The method for degassing at least a portion of a hydraulic vehicle brake system of claim 1, the hydraulic reservoir (18), after its evacuation, is re-filled by the hydraulic pump (14) and then evacuated again.

5. The method for degassing at least a portion of a hydraulic vehicle brake system of claim 1, wherein the degassing is performed with the vehicle at a stop.

6. A master cylinder (50) for degassing at least a portion of a hydraulic vehicle brake system by the method of claim 1, the master cylinder including a connection (60) associated with the wheel brake cylinder, which connection discharges approximately at a tangent into a cylinder bore (64) of the master cylinder (50).

* * * * *